(12) United States Patent
Ohga

(10) Patent No.: US 6,760,108 B2
(45) Date of Patent: Jul. 6, 2004

(54) IMAGE PROCESSING USING MEDIA WHITE POINT AND BLACK POINT

(75) Inventor: Manabu Ohga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 09/947,394

(22) Filed: Sep. 7, 2001

(65) Prior Publication Data

US 2002/0057434 A1 May 16, 2002

(30) Foreign Application Priority Data

Sep. 12, 2000 (JP) ......................................... 2000-276478

(51) Int. Cl.[7] ............................. G01N 21/25; G06K 9/00
(52) U.S. Cl. ........................ 356/406; 356/405; 382/167
(58) Field of Search ................................. 356/406, 402, 356/405, 407; 382/167

(56) References Cited

U.S. PATENT DOCUMENTS

| | | | | |
|---|---|---|---|---|
| 5,416,890 A | * | 5/1995 | Beretta | 345/590 |
| 5,579,031 A | * | 11/1996 | Liang | 345/604 |
| 5,699,491 A | | 12/1997 | Barzel | 395/109 |
| 6,108,442 A | | 8/2000 | Edge et al. | 382/167 |
| 6,310,696 B1 | * | 10/2001 | Kumada | 358/1.9 |
| 6,377,355 B1 | * | 4/2002 | Kumada | 358/1.12 |
| 6,480,299 B1 | * | 11/2002 | Drakopoulos et al. | 358/1.9 |

FOREIGN PATENT DOCUMENTS

| | | |
|---|---|---|
| EP | 753725 | 1/1997 |
| EP | 1009161 | 6/2000 |
| EP | 1079606 | 2/2001 |
| JP | 2000-175062 | 6/2000 |
| JP | 2001-036758 | 2/2001 |

* cited by examiner

Primary Examiner—Frank G. Font
Assistant Examiner—Roy M. Punnoose
(74) Attorney, Agent, or Firm—Fitzpatrick, Cella, Harper & Scinto

(57) ABSTRACT

An object of the present invention is to realize to excellently perform a color matching process among media having different white points. To achieve the above object, a colorimetry value of a sample is corrected on a human's color perception space on the basis of a media white point in case of creating transformation data used in transformation performed between data on a color space depending on a device and data on a color space not depending on a device, and the transformation data is created on the basis of the corrected colorimetry value.

12 Claims, 4 Drawing Sheets

IMAGE PROCESSING USING MEDIA WHITE POINT AND BLACK POINT

BACKGROUND OF THE INVENTION

1. Field of the Invention

The present invention relates to a correction based on media white points in case of creating data used in a color matching process.

2. Related Background Art

FIG. 1 is a conceptional view showing a general color matching process executed among different devices. Input data being R (red), G (green) and B (blue) data is transformed to X, Y and Z data on a color space not depending on the device, by an input profile. Since colors other than colors in a color reproduction range (gamut) of an output device can not be represented by the output device, color gamut mapping is executed to the input data to obtain data on the color space not depending on the device such that all of the colors can be included in the color reproduction range of the output device. After executing the color gamut mapping, the input data is transformed from the data on the color space not depending on the device to C (cyan), M (magenta), Y (yellow) and K (black) data on a color space depending on the output device.

In the color matching process, a reference white point and environment light are fixed. For example, in profiles regulated by ICC (International Color Consortium), PCS (Profile Connection Space) for connecting profiles has XYZ values (i.e., X, Y and Z values) and Lab values under the reference of D50. Therefore, correct color reproduction for input originals and print outputs can be guaranteed in case of performing observation under a light source of which characteristic is defined by the reference of D50, and the correct color reproduction can not be guaranteed under a light source of other characteristics.

In case of observing the same sample (e.g., an image) under different light sources, the XYZ values for the sample to be observed are naturally differed in their values. In order to make a prediction of the XYZ values under the different light sources, there are transformation systems such as a prediction expression and the like according to (1) ratio transformation, (2) Von Kries transformation, (3) color perception model, and the like.

The ratio transformation is such a method of performing a ratio transformation of W2/W1 in order to transform XYZ values under a reference white point W1 to XYZ values under a reference white point W2. When this method is adopted to a Lab uniform color space, Lab values under the W1 coincide with Lab values under the W2. For example, when XYZ values for a sample under the W1 (Xw1, Yw1, Zw1) are assumed as XYZ values (X1, Y1, Z1), and XYZ values for a sample under the W2 (Xw2, Yw2, Zw2) are assumed as XYZ values (X2, Y2, Z2), following relationship is obtained according to the ratio transformation.

$$X2=(Xw2/Xw1) \cdot X1$$

$$Y2=(Yw2/Yw1) \cdot Y1$$

$$Z2=(Zw2/Zw1) \cdot Z1 \qquad (1)$$

The Von Kries transformation is such a method of performing a ratio transformation of W2'/W1' on a human's color perception space PQR in order to transform the XYZ values under the W1 to the XYZ values under the W2. When this method is adopted to the Lab uniform color space, the Lab values under the W1 are not coincided with the Lab values under the W2. For example, when the XYZ values for the sample under the W1(Xw1, Yw1, Zw1) are assumed as the XYZ values (X1, Y1, Z1), and the XYZ values for the sample under the W2(Xw2, Yw2, Zw2) are assumed as the XYZ values (X2, Y2, Z2), following relationship is obtained according to the Von Kries transformation.

$$\begin{bmatrix} X2 \\ Y2 \\ Z2 \end{bmatrix} = [M^{-1}] \begin{bmatrix} P2/P1 & 0 & 0 \\ 0 & Q2/Q1 & 0 \\ 0 & 0 & R2/R1 \end{bmatrix} [M] \begin{bmatrix} X1 \\ Y1 \\ Z1 \end{bmatrix} \qquad (2)$$

where, $$\begin{bmatrix} P1 \\ Q1 \\ R1 \end{bmatrix} = [M] \begin{bmatrix} Xw1 \\ Yw1 \\ Zw1 \end{bmatrix}$$

$$\begin{bmatrix} P2 \\ Q2 \\ R2 \end{bmatrix} = [M] \begin{bmatrix} Xw2 \\ Yw2 \\ Zw2 \end{bmatrix}$$

$$[M] = \begin{bmatrix} 0.40024 & 0.70760 & -0.08081 \\ -0.22630 & 1.16532 & 0.04570 \\ 0 & 0 & 0.91822 \end{bmatrix}$$

$$[M^{-1}] = \begin{bmatrix} 1.85995 & -1.12939 & 0.21990 \\ 0.36119 & 0.63881 & 0 \\ 0 & 0 & 1.08906 \end{bmatrix}$$

The prediction expression according to the color perception model is a method of performing transformation by utilizing, for example, a human's color perception space QMH (or JCH) such as a space related in the CIECAM97s in order to transform XYZ values under an observation condition VC1 (including W1) to XYZ values under an observation condition VC2 (including W2). Where, symbol Q in the abbreviation QMH denotes brightness, symbol M denotes colorfulness and symbol H denotes huequadrature or hueangle. Symbol J in the abbreviation JCH denotes lightness, symbol C denotes chroma and symbol H denotes huequadrature or hueangle.

For example, when the XYZ values for the sample under the W1(Xw1, Yw1, Zw1) are assumed as the XYZ values (X1, Y1, Z1), and the XYZ values for the sample under the W2(Xw2, Yw2, Zw2) are assumed as the XYZ values (X2, Y2, Z2), the following transformation is performed according to the color perception model.

That is, $(X1, Y1, Z1) \rightarrow$[CIECAM97s forward transformation]$\rightarrow (Q, M, H)$ or $(J, C, H) \rightarrow$[CIECAM97s inverse transformation]$\rightarrow (X2, Y2, Z2)$ \qquad (3)

However, the above description depends on a case that the sample is represented on ideal media (white point on medium corresponds to complete reflection and black point on medium corresponds to complete absorption), while the media actually used have different conditions.

For example, since colors displayed on a monitor are represented by light source colors, a white point on medium for color data of R=G=B=225 can be considered as relative brightness of Y=100%, however, a black point on medium for color data of R=G=B=0 does not correspond to relative brightness of Y=0%. Since color of printed matter corresponds to color of the object (or objective color), whiteness in paper represented by C=M=Y=K=0% has a certain reflection ratio γ, therefore, the relative brightness of Y=100% can not be obtained. Even color represented by C=M=Y=K=100% being the most dark color is not resulted in the relative brightness of Y=0%.

Since the whiteness in paper of the printed matter does not have characteristic of complete reflection, it does not coincide with the white point (e.g., D50) of light source to be irradiated. Similarly, black (C=M=Y=K=100%) available in a device does not exist on a gray axis of the light source (chroma identical to that of the light source) to be irradiated.

Hereinafter, a white point (color corresponding to R=G=B=255 in an RGB device, and corresponding to C=M=Y=K=0% in a CMYK device) represented on medium of each device is defined as "media white point". A black point (color corresponding to R=G=B=0 in the RGB device, and corresponding to C=M=Y=K=100% in the CMYK device) represented on medium of each device is defined as "media black point".

As in the above description, since "white point of light source", "media white point", "black point of light source" and "media black point" are different, in case of performing comparison of images on different media under the same light source, there sometimes occurs a case that impressions of those images are different from each other. For example, in a case where white points on media are different from each other such as white points on a blank (white) paper and newspaper (or a recycled paper), when those media are laterally arranged for the comparison, it is obviously recognized by a person that the whiteness in paper are different from each other. However, in case of individually performing the comparison for each of media, even if a media white point is considerably different from other media white points, like the newspaper, the person perceives the whiteness on a paper as "white". This phenomenon occurs due to a fact that human's visual perception is adapted to the color of white. And, if the XYZ values under the same light source are only to be coincided, the XYZ values for the color to be printed may be coincided, however, the whiteness in paper in a background is remained in different state, and there is possibility of overlapping the color on a white background.

Similarly, with respect to the media black point, the black points represented on media are different from each other according to each device. In case of individually performing the comparison for each of media, even if the black points on media are different from each other, the person perceives the blackness on the paper as "black". Therefore, it is considered that the human's visual perception is also adapted to the color of black. Problems in the color matching process executed among devices having different color reproduction ranges can be avoided by the color gamut mapping technology. However, with respect to a dark portion adjacent to the black point, there sometimes occurred blocked up color (or broken color) even if the color gamut mapping technology is used.

In order to solve these problems, it is required to execute the color matching process not only coinciding the XYZ values under the same light source but also considering the media white point and the media black point.

In the conventional white point correction and black point correction performed on media, there utilized a simple method of executing a scaling process in accordance with brightness (or reflection ratio) after correcting the XYZ values of the sample by using the black point. That is, when a white point on medium is assumed as $MW1(Xmw1, Ymw1, Zmw1)$ and a black point on medium is assumed as $MK1(Xmk1, Ymk1, Zmk1)$, the relationship between the sample $(X1, Y1, Z1)$ on medium and the correction sample $(X2, Y2, Z2)$ was indicated as follows:

"White Point Correction and Black Point Correction on Media"

$$X2=(X1-Xmk1)/(Ymw1-Ymk1)$$

$$Y2=(Y1-Ymk1)/(Ymw1-Ymk1)$$

$$Z2=(Z1-Zmk1)/(Ymw1-Ymk1) \qquad (4)$$

In the profile regulated by the ICC, in case of representing the XYZ values for the sample on medium on the PCS (D50), it is recommended that the XYZ values are to be relative relation to the media white point. However, that transformation method is not yet established, and a simple method as mentioned below has been used (ICC specification). That is, when a white point on medium is assumed as $MW2(Xmw2, Ymw2, Zmw2)$, and a white point of the light source on the PCS is assumed as $IW3(Xiw3, Yiw3, Ziw3)$, the relationship between the sample $(X2, Y2, Z2)$ on medium and a sample $(X3, Y3, Z3)$ on the PCS was indicated as follows:

"Correction from White Points on Media to White Points on PCS (D50)"

$$X3=(Xiw3/Xmw2) \cdot X2$$

$$Y3=(Yiw3/Ymw2) \cdot Y2$$

$$Z3=(Ziw3/Zmw2) \cdot Z2 \qquad (5)$$

However, since the expression (4) and the expression (5) are both based on the ratio transformation on a XYZ color space, the obtained result was not fitted to the human's color perception. Furthermore, the expression (4) has a defect that chromaticity of the white point is varied due to the XYZ values of the black point.

SUMMARY OF THE INVENTION

That is, in the color matching process executed among media having different white points and different black points, there were the following problems:

how the color matching process executed among the media having different white points is to be treated; and how the color matching process executed among the media having different black points is to be treated.

An object of the present invention is to solve these problems.

To achieve the above object, the present invention has the following constitution.

An image processing method of creating transformation data used in transformation performed between data on a color space depending on a device and data on a color space not depending on a device is characterized in that a colorimetry value of a sample is corrected on a human's color perception space on the basis of a media white point, and the transformation data is created on the basis of the corrected colorimetry value.

An image processing method of creating transformation data used in a color matching process executed between a source device and a destination device is characterized in that a white point correction for transforming colors on media at the source device side to colors on media at the destination device side is performed on a human's color perception space on the basis of white points on media at the source device side and white points on media at the destination device side.

A recording medium for recording a program of realizing an image processing method of creating transformation data used in transformation performed between data on a color space depending on a device and data on a color space not depending on a device is characterized in that a colorimetry value of a sample is corrected on a human's color perception space on the basis of a media white point, and a program for creating the transformation data on the basis of the corrected colorimetry value is recorded.

A recording medium for recording a program of realizing an image processing method of creating transformation data used in a color matching process executed between a source device and a destination device is characterized in that a program for performing a white point correction for transforming colors on media at the source device side to colors on media at the destination device side on a human's color perception space on the basis of white points on media at the source device side and white points on media at the destination device side is recorded.

The above and other objects of the present invention will become apparent from the following detailed description in conjunction with the attached drawings.

DETAILED DESCRIPTION OF THE PREFERRED EMBODIMENTS

Hereinafter, a method of considering the relationship between "white point of light source" and "media white point" and the relationship between "black point of light source" and "media black point" in case of creating a profile used in a color matching process will be explained.

For example, in the creation of a profile of a printer, color of a sample outputted by the printer is measured. A colorimetry value is corrected on a color perception space on the basis of the relationship between the "white point of light source" and the "media white point" and the relationship between the "black point of light source" and the "media black point". Then, the profile is created on the basis of the corrected colorimetry value. As values of the "media white point" and the "media black point", colorimetry values corresponding to the above definition are used.

The creation of the profile and the color matching process are realized in a manner that a CPU uses a RAM as a work memory on the basis of an OS stored in a ROM and a application program used for realizing the following processes on a personal computer connected to, for example, a target device and a colorimeter.

<In case of executing process through PCS>

Figure 1:
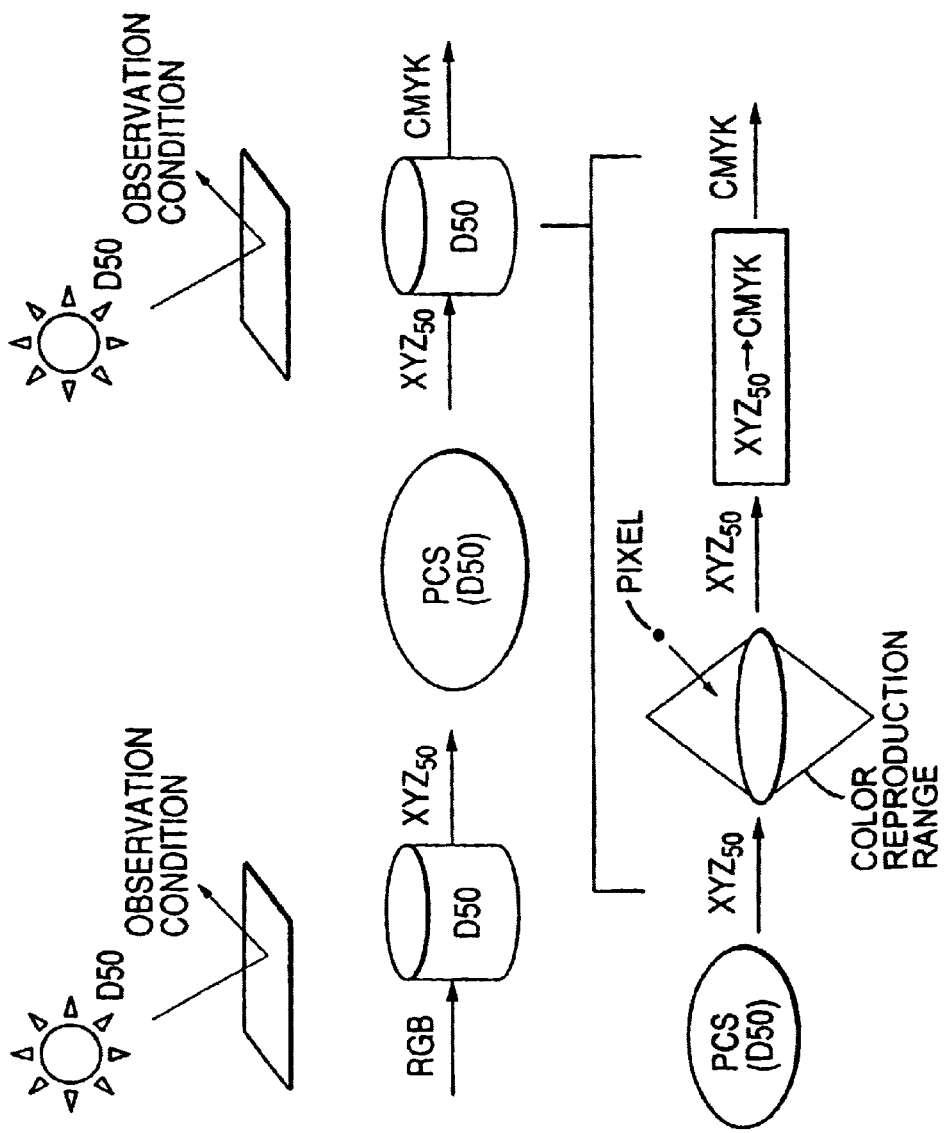
FIG. 1 is a view for explaining a color matching process.
Figure 2A:
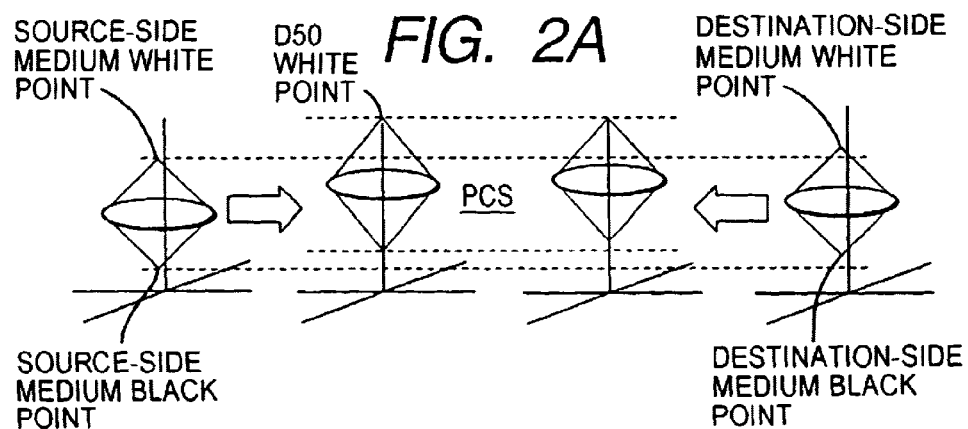
FIGS. 2A and 2B are views for explaining a white point correction and a black point correction.
Figure 2B:
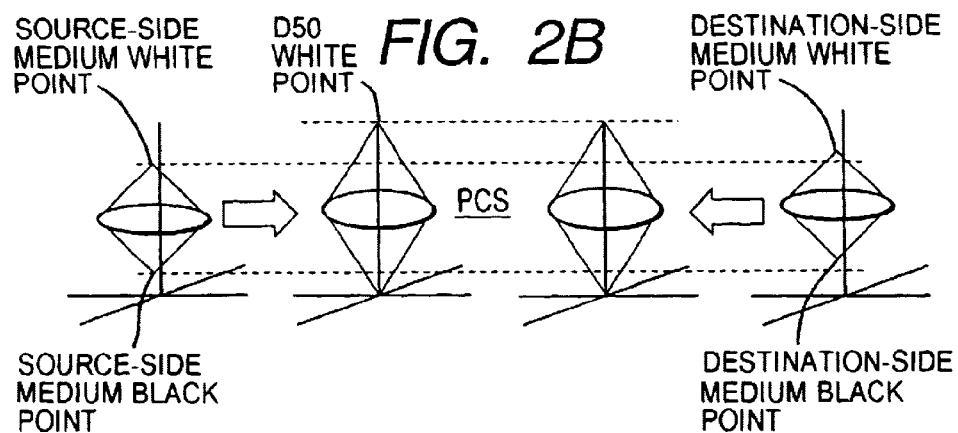

FIGS. 2A and 2B are views where a result (FIG. 2A) obtained by performing a correction according to a white point on medium is compared with a result (FIG. 2B) obtained by performing a correction according to the white point and a black point on medium. In FIGS. 2A and 2B, the left side indicates a source device side and the right side indicates a destination device side.

In order to realize the color matching process considering white points and black points on media on an ICC profile, a white point correction or a black point correction is performed to colorimetry values (X, Y, Z) obtained by the calorimeter, then the ICC profile is created using colorimetry values (X', Y', Z') to which the correction was performed.

If a target scene is limited on medium, it is understood that human's color perception is adapted to the white point on medium rather than adapted to the white point of light source. Also, as to the black point on medium, it is similarly understood that the human's color perception is adapted to the black point on medium.

In a method of transforming the white point on medium to the white point on the PCS (D50), it is assumed that human's visual perception is adapted to the media white point, and a color adaptation model is adopted. That is, when the white point on medium is assumed as MW2(Xmw2, Ymw2, Zmw2), and the white point of light source on the PCS under the reference of D50 is assumed as IW3(Xiw3, Yiw3, Ziw3), the relationship between the sample (X2, Y2, Z2) on medium and the sample (X3, Y3, Z3) on the PCS is indicated as follows, for example, if the Von Kries transformation is used as the color adaptation model.

$$\begin{bmatrix} X3 \\ Y3 \\ Z3 \end{bmatrix} = [M^{-1}] \begin{bmatrix} P3/P2 & 0 & 0 \\ 0 & Q3/Q2 & 0 \\ 0 & 0 & R3/R2 \end{bmatrix} [M] \begin{bmatrix} X2 \\ Y2 \\ Z2 \end{bmatrix} \quad (6)$$

where, $$\begin{bmatrix} P2 \\ Q2 \\ R2 \end{bmatrix} = [M] \begin{bmatrix} Xmw2 \\ Ymw2 \\ Zmw2 \end{bmatrix}$$

$$\begin{bmatrix} P3 \\ Q3 \\ R3 \end{bmatrix} = [M] \begin{bmatrix} Xiw3 \\ Yiw3 \\ Ziw3 \end{bmatrix}$$

$$[M] = \begin{bmatrix} 0.40024 & 0.70760 & -0.08081 \\ -0.22630 & 1.16532 & 0.04570 \\ 0 & 0 & 0.91822 \end{bmatrix}$$

$$[M^{-1}] = \begin{bmatrix} 1.85995 & -1.12939 & 0.21990 \\ 0.36119 & 0.63881 & 0 \\ 0 & 0 & 1.08906 \end{bmatrix}$$

Where, a color space PQR transformed by the 3×3 matrix [M] corresponds to human's cone-response for the white point.

In case of performing only the white point correction as in FIG. 2A, since the white point on medium is transformed to the white point under the reference of D50, it is understood that lightness of the black point on the PCS (Lab) is increased due to the correction. This phenomenon does not become a problem in a case where brightness (or reflection ratio) of the white point on medium at the source device side is almost same as that at the destination device side, however, if the difference in the brightness becomes larger, this situation causes a black floating (fogging) phenomenon or the like.

On the other hand, in case of performing the white point correction and the black point correction as in FIG. 2B, since the white point and the black point at the source device side coincide with the white point and the black point at the destination device side, a visual dynamic range can be kept and the black floating (fogging) phenomenon can be prevented.

In the Von Kries transformation, when cone-response for a white point under a light source IA is assumed to be defined as (Pw, Qw, Rw), and cone-response for arbitrary color N under the light source IA is assumed to be defined as (P, Q, R), the following relationship is to be formed between the cone-response (Pw, Qw, Rw) and cone-response (Pw', Qw', Rw') for a white point under a light source IB, and between the cone-response (P, Q, R) and cone-response (P', Q', R') for arbitrary color N under the light source IB.

$$P/Pw = P'/Pw'$$

$$Q/Qw = Q'/Qw'$$

$$R/Rw = R'/Rw' \quad (7)$$

Expanding this relationship, when the influence by cone-response (Pk, Qk, Rk) for a black point under the light source IA and cone-response (Pk', Qk', Rk') for a black point under the light source IB is considered, the following relationship is given.

$$(P-Pk)/(Pw-Pk) = (P'-Pk')/(Pw'-Pk')$$

$$(Q-Qk)/(Qw-Qk) = (Q'-Qk')/(Qw'-Qk')$$

$$(R-Rk)/(Rw-Rk) = (R'-Rk')/(Rw'-Rk') \quad (8)$$

When the above relationship is adopted to a method of transforming the white point and the black point on medium to those on the PCS (D50), the color adaptation model for adapting the human's visual perception to the white point and the black point on medium can be fetched. That is, when the white point on medium is assumed as MW1(Xmw1, Ymw1, Zmw1), the black point on medium is assumed as MK1(Xmk1, Ymk1, Zmk1), the white point of light source on the PCS under the reference of D50 is assumed as IW2(Xiw2, Yiw2, Ziw2) and the black point (0, 0, 0) of light source on the PCS is assumed as IK2(Xik2, Yik2, Zik2), the relationship between the sample (X1, Y1, Z1) on medium and the sample (X2, Y2, Z2) on the PCS is indicated as follows, for example, if the Von Kries transformation is used as the color adaptation model.

$$\begin{bmatrix} X2 \\ Y2 \\ Z2 \end{bmatrix} = [M^{-1}] \begin{bmatrix} (P2w - P2k) \cdot \{(P - P1k)/(P1w - P1k)\} + P2k \\ (Q2w - Q2k) \cdot \{(Q - Q1k)/(Q1w - Q1k)\} + Q2k \\ (R2w - R2k) \cdot \{(R - R1k)/(R1w - R1k)\} + R2k \end{bmatrix} \quad (9)$$

where, $$\begin{bmatrix} P \\ Q \\ R \end{bmatrix} = [M] \begin{bmatrix} X1 \\ Y1 \\ Z1 \end{bmatrix}$$

$$\begin{bmatrix} P1w \\ Q1w \\ R1w \end{bmatrix} = [M] \begin{bmatrix} Xmw1 \\ Ymw1 \\ Zmw1 \end{bmatrix}$$

$$\begin{bmatrix} P1k \\ Q1k \\ R1k \end{bmatrix} = [M] \begin{bmatrix} Xmk1 \\ Ymk1 \\ Zmk1 \end{bmatrix}$$

$$\begin{bmatrix} P2w \\ Q2w \\ R2w \end{bmatrix} = [M] \begin{bmatrix} Xiw2 \\ Yiw2 \\ Ziw2 \end{bmatrix}$$

$$\begin{bmatrix} P2k \\ Q2k \\ R2k \end{bmatrix} = [M] \begin{bmatrix} Xik2 \\ Yik2 \\ Zik2 \end{bmatrix}$$

$$[M] = \begin{bmatrix} 0.40024 & 0.70760 & -0.08081 \\ -0.22630 & 1.16532 & 0.04570 \\ 0 & 0 & 0.91822 \end{bmatrix}$$

$$[M^{-1}] = \begin{bmatrix} 1.85995 & -1.12939 & 0.21990 \\ 0.36119 & 0.63881 & 0 \\ 0 & 0 & 1.08906 \end{bmatrix}$$

Also, the expression (9) can be modified as follows.

$$\begin{bmatrix} X2 \\ Y2 \\ Z2 \end{bmatrix} = [M^{-1}][N_G][M] \begin{bmatrix} X1 - Xmk1 \\ Y1 - Ymk1 \\ Z1 - Zmk1 \end{bmatrix} + \begin{bmatrix} Xik2 \\ Yik2 \\ Zik2 \end{bmatrix} \quad (10)$$

where, $$[N_G] = \begin{bmatrix} (P2w - P2k)/(P1w - P1k) & 0 & 0 \\ 0 & (Q2w - Q2k)/(Q1w - Q1k) & 0 \\ 0 & 0 & (R2w - R2k)/(R1w - R1k) \end{bmatrix}$$

$$\begin{bmatrix} P1w \\ Q1w \\ R1w \end{bmatrix} = [M] \begin{bmatrix} Xmw1 \\ Ymw1 \\ Zmw1 \end{bmatrix}$$

$$\begin{bmatrix} P1k \\ Q1k \\ R1k \end{bmatrix} = [M] \begin{bmatrix} Xmk1 \\ Ymk1 \\ Zmk1 \end{bmatrix}$$

$$\begin{bmatrix} P2w \\ Q2w \\ R2w \end{bmatrix} = [M] \begin{bmatrix} Xiw2 \\ Yiw2 \\ Ziw2 \end{bmatrix}$$

$$\begin{bmatrix} P2k \\ Q2k \\ R2k \end{bmatrix} = [M] \begin{bmatrix} Xik2 \\ Yik2 \\ Zik2 \end{bmatrix}$$

$$[M] = \begin{bmatrix} 0.40024 & 0.70760 & -0.08081 \\ -0.22630 & 1.16532 & 0.04570 \\ 0 & 0 & 0.91822 \end{bmatrix}$$

$$[M^{-1}] = \begin{bmatrix} 1.85995 & -1.12939 & 0.21990 \\ 0.36119 & 0.63881 & 0 \\ 0 & 0 & 1.08906 \end{bmatrix}$$

As above, by creating a profile using the white point correction and the black point correction of the present embodiment according to the white point and the black point on media, the color transformation can be performed such that gray scales (color arrangement of connecting white point with black point) on different media are coincided with each other on the human's color perception space, and the color matching process more approximate to the human's color perception can be realized.

[Other Embodiment]

<In Case of Executing Process not Through PCS>

In the above embodiment, the expressions (6), (9) and (10) indicate a case that a process is executed through the PCS. However, the white point at the source device side can be corresponded to the white point at the destination device side, and the black point at the source device side can be corresponded to the black point at the destination device side not through the PCS. With respect to the above method, in a private tag or the like of the ICC profile, the colorimetry value under each observation condition is stored as it is without storing the PCS value, and this method is used in a color matching module (CMM) which performs the color matching process by utilizing that information.

In a method of converting the white points on media at the source device side to the white points on media at the destination device side, it is assumed that the human's visual perception is adapted to the white point on each of media, and the color adaptation model is adopted. That is, when the white point on medium at the source device side is assumed as MW1(Xmw1, Ymw1, Zmw1), and the white point on medium at the destination device side is assumed as MW2(Xmw2, Ymw2, Zmw2), the relationship between the sample (X1, Y1, Z1) on medium at the source device side and the sample (X2, Y2, Z2) on medium at the destination device side is indicated as follows, for example, if the Von Kries transformation is used as the color adaptation model.

$$\begin{bmatrix} X2 \\ Y2 \\ Z2 \end{bmatrix} = [M^{-1}] \begin{bmatrix} P2/P1 & 0 & 0 \\ 0 & Q2/Q1 & 0 \\ 0 & 0 & R2/R1 \end{bmatrix} [M] \begin{bmatrix} X1 \\ Y1 \\ Z1 \end{bmatrix} \quad (11)$$

where, $$\begin{bmatrix} P1 \\ Q1 \\ R1 \end{bmatrix} = [M] \begin{bmatrix} Xmw1 \\ Ymw1 \\ Zmw1 \end{bmatrix}$$

$$\begin{bmatrix} P2 \\ Q2 \\ R2 \end{bmatrix} = [M] \begin{bmatrix} Xmw2 \\ Ymw2 \\ Zmw2 \end{bmatrix}$$

$$[M] = \begin{bmatrix} 0.40024 & 0.70760 & -0.08081 \\ -0.22630 & 1.16532 & 0.04570 \\ 0 & 0 & 0.91822 \end{bmatrix}$$

$$[M^{-1}] = \begin{bmatrix} 1.85995 & -1.12939 & 0.21990 \\ 0.36119 & 0.63881 & 0 \\ 0 & 0 & 1.08906 \end{bmatrix}$$

In a method of converting the white points and the black points on media at the source device side to the white points and the black points on media at the destination device side, it is assumed that the human's visual perception is adapted to the white points and the black points on media, and the color adaptation model is adopted. That is, when the white point on medium at the source device side is assumed as MW1(Xmw1, Ymw1, Zmw1), the black point on medium at the source device side is assumed as MK1(Xmk1, Ymk1, Zmk1), the white point on medium at the destination device side is assumed as MW2(Xmw2, Ymw2, Zmw2) and the black point on medium at the destination device side is assumed as MK2(Xmk2, Ymk2, Zmk2), the relationship between the sample (X1, Y1, Z1) on medium at the source device side and the sample (X2, Y2, Z2) on medium at the destination device side is indicated as follows, for example, if the Von Kries transformation is used as the color adaptation model.

$$\begin{bmatrix} X2 \\ Y2 \\ Z2 \end{bmatrix} = [M^{-1}] \begin{bmatrix} (P2w - P2k) \cdot \{(P - P1k)/(P1w - P1k)\} + P2k \\ (Q2w - Q2k) \cdot \{(Q - Q1k)/(Q1w - Q1k)\} + Q2k \\ (R2w - R2k) \cdot \{(R - R1k)/(R1w - R1k)\} + R2k \end{bmatrix} \quad (12)$$

where, $$\begin{bmatrix} P \\ Q \\ R \end{bmatrix} = [M] \begin{bmatrix} X1 \\ Y1 \\ Z1 \end{bmatrix}$$

$$\begin{bmatrix} P1w \\ Q1w \\ R1w \end{bmatrix} = [M] \begin{bmatrix} Xmw1 \\ Ymw1 \\ Zmw1 \end{bmatrix}$$

$$\begin{bmatrix} P1k \\ Q1k \\ R1k \end{bmatrix} = [M] \begin{bmatrix} Xmk1 \\ Ymk1 \\ Zmk1 \end{bmatrix}$$

$$\begin{bmatrix} P2w \\ Q2w \\ R2w \end{bmatrix} = [M] \begin{bmatrix} Xmw2 \\ Ymw2 \\ Zmw2 \end{bmatrix}$$

$$\begin{bmatrix} P2k \\ Q2k \\ R2k \end{bmatrix} = [M] \begin{bmatrix} Xmk2 \\ Ymk2 \\ Zmk2 \end{bmatrix}$$

$$[M] = \begin{bmatrix} 0.40024 & 0.70760 & -0.08081 \\ -0.22630 & 1.16532 & 0.04570 \\ 0 & 0 & 0.91822 \end{bmatrix}$$

$$[M^{-1}] = \begin{bmatrix} 1.85995 & -1.12939 & 0.21990 \\ 0.36119 & 0.63881 & 0 \\ 0 & 0 & 1.08906 \end{bmatrix}$$

The expression (12) can be modified as follows.

$$\begin{bmatrix} X2 \\ Y2 \\ Z2 \end{bmatrix} = [M^{-1}][N_G][M] \begin{bmatrix} X1 - Xmk1 \\ Y1 - Ymk1 \\ Z1 - Zmk1 \end{bmatrix} + \begin{bmatrix} Xmk2 \\ Ymk2 \\ Zmk2 \end{bmatrix} \quad (13)$$

where, $$[N_G] = \begin{bmatrix} (P2w - P2k)/(P1w - P1k) & 0 & 0 \\ 0 & (Q2w - Q2k)/(Q1w - Q1k) & 0 \\ 0 & 0 & (R2w - R2k)/(R1w - R1k) \end{bmatrix}$$

$$\begin{bmatrix} P1w \\ Q1w \\ R1w \end{bmatrix} = [M] \begin{bmatrix} Xmw1 \\ Ymw1 \\ Zmw1 \end{bmatrix}$$

$$\begin{bmatrix} P1k \\ Q1k \\ R1k \end{bmatrix} = [M] \begin{bmatrix} Xmk1 \\ Ymk1 \\ Zmk1 \end{bmatrix}$$

$$\begin{bmatrix} P2w \\ Q2w \\ R2w \end{bmatrix} = [M] \begin{bmatrix} Xmw2 \\ Ymw2 \\ Zmw2 \end{bmatrix}$$

-continued $$\begin{bmatrix} P2k \\ Q2k \\ R2k \end{bmatrix} = [M] \begin{bmatrix} Xmk2 \\ Ymk2 \\ Zmk2 \end{bmatrix}$$

$$[M] = \begin{bmatrix} 0.40024 & 0.70760 & -0.08081 \\ -0.22630 & 1.16532 & 0.04570 \\ 0 & 0 & 0.91822 \end{bmatrix}$$

$$[M^{-1}] = \begin{bmatrix} 1.85995 & -1.12939 & 0.21990 \\ 0.36119 & 0.63881 & 0 \\ 0 & 0 & 1.08906 \end{bmatrix}$$

<Bradford Transformation>

In the above embodiment, the Von Kries transformation is utilized as the color adaptation model, however, the Bradford transformation can be also utilized.

In case of utilizing the Bradford transformation, instead of the 3×3 matrices [M] and [M$^{-1}$] in the expressions (6), (9) and (10), and the expressions (11), (12) and (13), the following 3×3 matrices [M$_B$] and [M$_B^{-1}$] are adopted.

$$[M_B] = \begin{bmatrix} 0.8951 & 0.2664 & -0.1614 \\ -0.7502 & 1.7135 & 0.0367 \\ 0.0389 & -0.0685 & 1.0296 \end{bmatrix} \quad (14)$$

$$[M_B^{-1}] = \begin{bmatrix} 0.9870 & -0.1471 & 0.1600 \\ 0.4323 & 0.5184 & 0.0493 \\ -0.0085 & 0.0400 & 0.9685 \end{bmatrix}$$

<CIECAM97s>

In case of adopting the CIECAM97s as a color perception model by utilizing the color perception model instead of the color adaptation model, the following method is adopted in a color adaptation transformation of a CIECAM97s forward transformation.

$$Rc=[D(1.0/Rw)+1-D]R$$

$$Gc=[D(1.0/Gw)+1-D]G$$

$$Bc=[D(1.0/Bw^p)+1-D]|B|^p \quad (15)$$

where, $$p=(Bw/1.0)^{0.0834}$$

Instead of $D=F-F/[1+2(L_A^{1/4})+(L_A^2)/300]$, $$Rc=[D(1.0/(Rw-Rk))+1-D](R-Rk)$$

$$Gc=[D(1.0/(Gw-Gk))+1-D](G-Gk)$$

$$Bc=[D(1.0/(Bw-Bk)^p)+1-D]|B-Bk|^p \quad (16)$$

where, $$p=((Bw-Bk)/1.0)^{0.0834}$$

$D=F-F/[1+2(L_A^{1/4})+(L_A^2)/300]$ is utilized.

Here, Rw, Gw, and Bw indicate R, G and B for the white point on medium, and Rk, Gk, and Bk indicate R, G and B for the black point on medium. Also, in a color adaptation transformation of a CIECAM97s inverse transformation, the similar displacement is performed.

<User Interface>

In case of creating the profile, it may be structured that a user can select whether or not the white point correction and the black point correction are performed for the colorimetry value, on the user interface (FIG. 3) of setting a profile creation condition.

Figure 3:
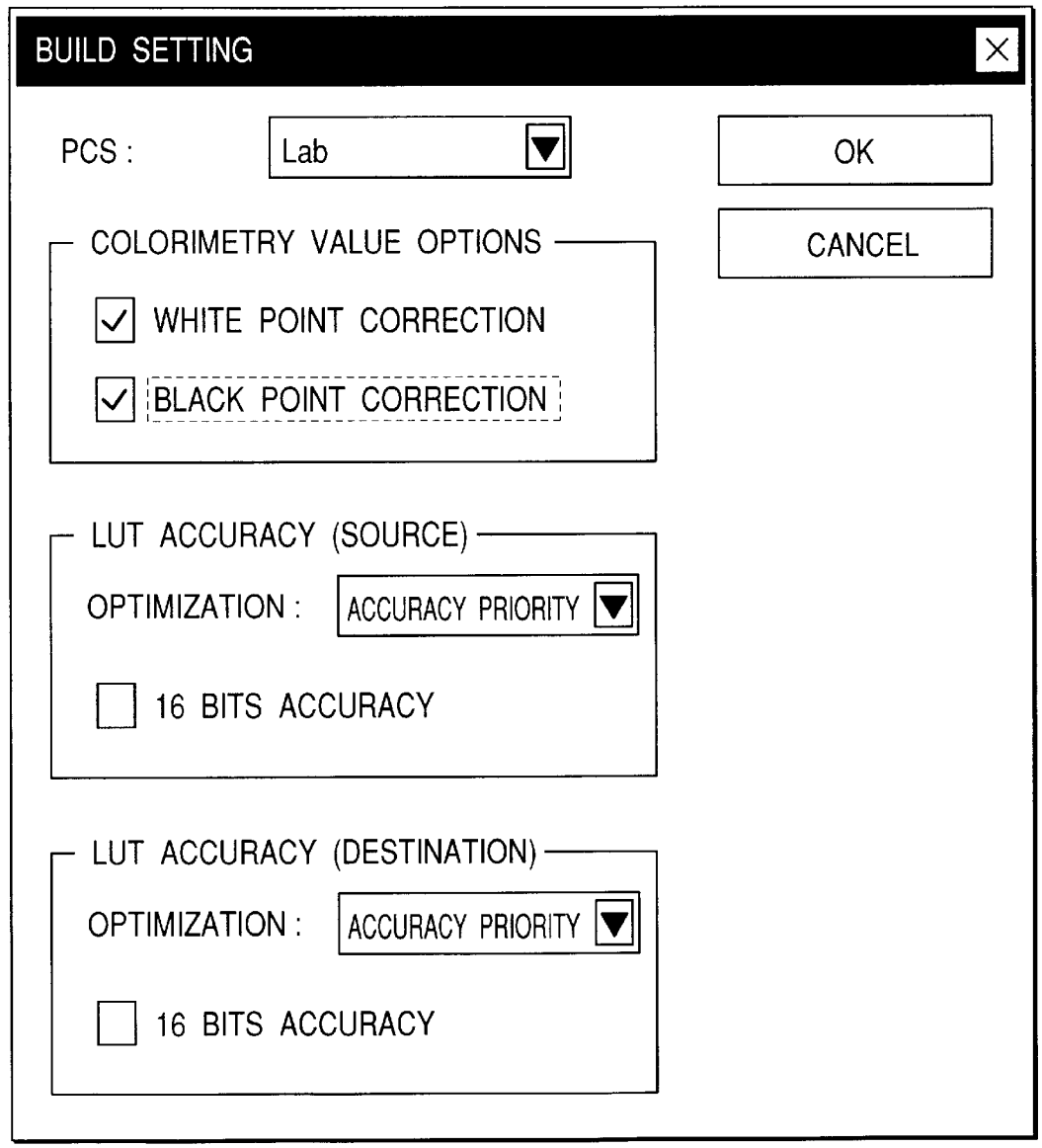
FIG. 3 is a view indicating a user interface for performing setting related to the white point correction and the black point correction under a condition of forming profiles.

In FIG. 3, since the white point correction and the black point correction are the processes for the colorimetry value as mentioned above, it is possible to set as "colorimetry value options".

As other options, it may be structured that "category regarding optimization" and "accuracy" for the selection of a creating method can be selected as a creation condition of a profile (LUT) to be created on the basis of the colorimetry value.

Furthermore, it may be structured that category of the color adaptation model or the color perception model used in the white point correction and the black point correction can be selected. Accordingly, the correction according to a user's preference and a using purpose can be realized.

Figure 4:
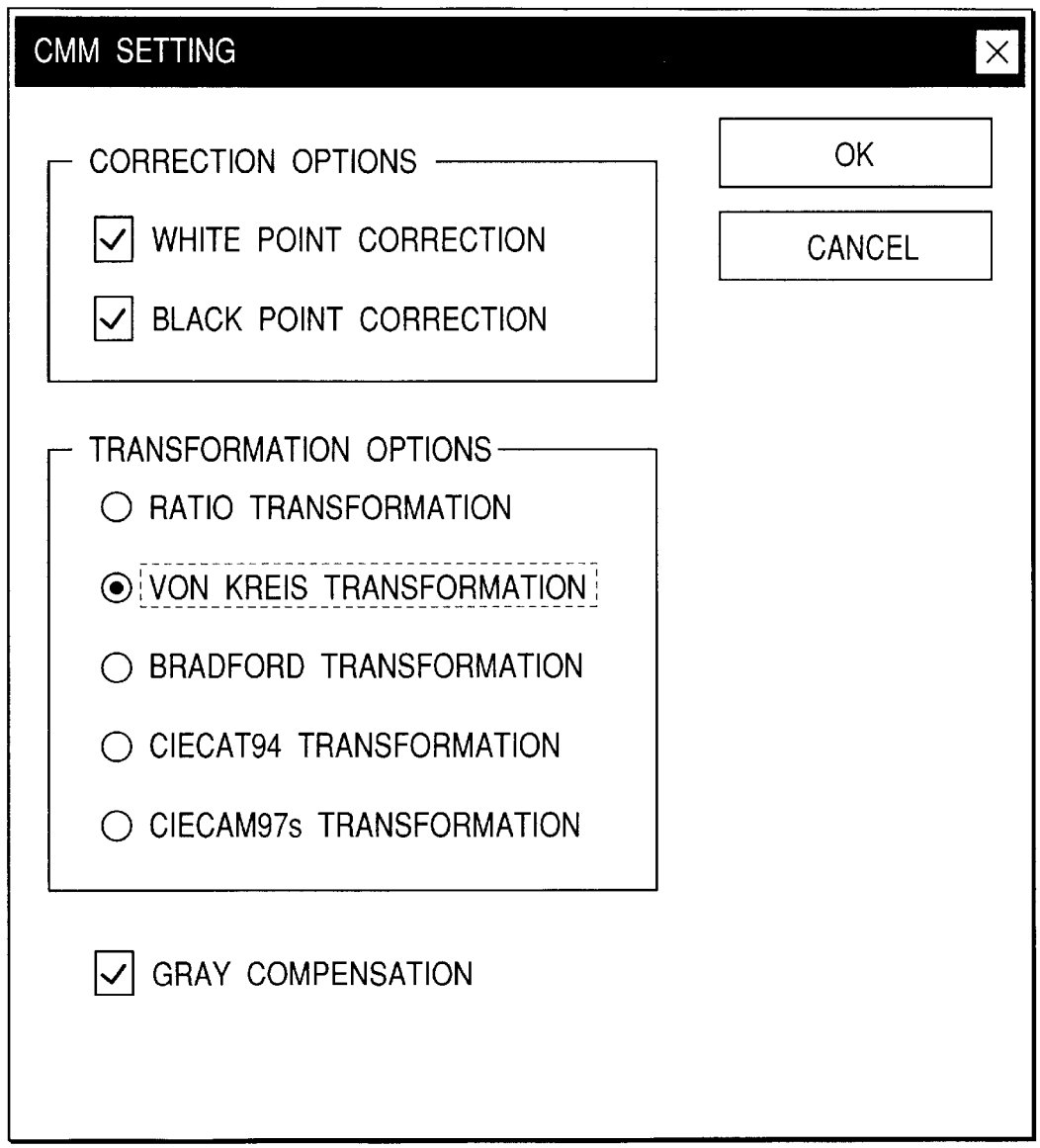
FIG. 4 is a view indicating a user interface for performing setting related to the white point correction and the black point correction under a condition of executing the color matching process.

Furthermore, in the condition of "in case of executing process not through PCS", it may be structured that it can be selected whether or not the white point correction and the black point correction are performed for the white points and the black points on media at the source device side and the white points and the black points on media at the destination device side as processing condition of the color matching process by using the interface as shown in FIG. 4. Also, it may be structured that category of the color adaptation model or the color perception model to be adopted in the correction can be selected.

According to the each embodiment explained in the above description, the color matching process more approximate to the human's color perception can be executed also among media having different white points by utilizing the color adaptation model such as the Von Kries transformation or the like, or the color perception model such as the CIECAM97s or the like in the white point correction performed among the media.

Furthermore, color reproducibility of a dark portion can be improved by performing not only the white point correction but also the black point correction on the human's color perception space.

As above, the present invention has been explained on the basis of the preferred embodiment. However, the present invention is not limited to the above embodiment, but may be modified in various manners within the spirit and scope of the appended claims.

What is claimed is:

1. An image processing method which creates, from a colorimetry value measured from a sample, a transformation for use in color data transformation between device-dependent and device-independent color spaces, the method comprising:

transforming the colorimetry value measured from a sample to a colorimetry value in a color perception space;

correcting the colorimetry value in the color perception space based differences in media white point and media black point; and creating the transformation for transforming color data between device-dependent and device-independent color spaces based on the corrected colorimetry value.

2. A method according to claim 1, wherein the colorimetry value of the sample is corrected on the basis of the media white point and a media black point.

3. A method according to claim 1, wherein it is set whether or not correction of the media white point is performed on the basis of an instruction given by a user.

4. A method according to claim 1, wherein a color correction method used in correcting the colorimetry value.

5. A method according to claim 1, wherein the color correction method is selected from among plural methods including a color adaptation model and a color perception model.

6. A method according to claim 1, wherein the transformation data represents a look-up table (LUT), and accuracy of the LUT is selectable based on a user's instruction.

7. An image processing method which performs color matching using source and destination environmental conditions, the method comprising:

transforming, using a forward transformation of a color appearance model, XYZ values under the source environment condition based on the source environment condition, a white point and a black point of a medium on the source side; and transforming, using an inverse transformation of the color appearance model, the transformed values based on the destination environment condition, a white point and a black point of a medium on the destination side; and outputting XYZ values under the destination environment condition.

8. A method according to claim 7, wherein a black point correction is further performed on a human's color perception space on the basis of black points on media at the source device side and black points on media at the destination device side.

9. A recording medium which records a program for realizing an image processing method which creates, from a colorimetry value measured from a sample, a transformation for use in color data transformation between device-dependent and device-independent color spaces, said method comprising the steps of:

transforming the colorimetry value measured from a sample to a colorimetry value in a color perception space;

correcting the colorimetry value transformed in the color perception space based differences in media white point and media black point; and creating the transformation for use in transformation between the device-dependent and device-independent color spaces.

10. A recording medium which records a program for realizing an image processing method which performs color matching using source and destination environmental conditions, the method comprising:

transforming, using a forward transformation of a color appearance model, XYZ values under the source environment condition based on the source environment condition, a white point and a black point of a medium on the source side; and transforming, using an inverse transformation of the color appearance model, the transformed values based on the destination environment condition, a white point and a black point of a medium on the destination side; and outputting XYZ values under the destination environment condition.

11. An image processing apparatus which creates, from a colorimetry value measured from a sample, a transformation for use in color data transformation between device-dependent and device-independent color spaces, said apparatus comprising:

a transforming unit, adapted to transform the colorimetry value measured from a sample to a colorimetry value in a color perception space;

a correcting unit, adapted to correct the colorimetry value in the color perception space based differences in media white point and media black point; and a creating unit, adapted to create the transformation for transforming color data between device-dependent and device-independent color spaces based on the corrected colorimetry value.

12. An image processing apparatus which performs color matching using source and destination environmental conditions, said apparatus comprising a first transforming unit, adapted to transform, using a forward transformation of a color appearance model, XYZ values under the source environment condition based on the source environment condition, a white point and a black point of a medium on the source side;

a second transforming unit, adapted to transform, using an inverse transformation of the color appearance model, the transformed values based on the destination environment condition, a white point and a black point of a medium on the destination side; and an outputting unit, adapted to output XYZ values under the destination environment condition.

* * * * *

UNITED STATES PATENT AND TRADEMARK OFFICE
CERTIFICATE OF CORRECTION

PATENT NO. : 6,760,108 B2
DATED : July 6, 2004
INVENTOR(S) : Manabu Ohga

It is certified that error appears in the above-identified patent and that said Letters Patent is hereby corrected as shown below:

<u>Title page,</u>
Item [*] Notice, "by 1 day" should read -- by 121 days --.

<u>Column 1,</u>
Line 38, "In" should read -- In the --;
Line 46, "such" should read -- such that --;
Line 47, "in" should read -- is in --; and
Line 55, "following" should read -- the following --.

<u>Column 2,</u>
Line 6, "following" should read -- the following --.

<u>Column 3,</u>
Line 5, "characteristic" should read -- characteristics --;
Line 6, "of" should read -- of the --;
Line 38, "is remained in" should read -- remains in a --; and "is" should read -- is a --; and
Line 59, "there" should read -- there is --.

<u>Column 5,</u>
Line 58, "<In case of executing process through PCS>" should read
-- <In Case of Executing Process Through PCS> --.

<u>Column 11,</u>
Line 18, "be also" should read -- also be --; and
Line 33, "In" should read -- In the --.

<u>Column 12,</u>
Line 67, "method" should read -- method is --.

UNITED STATES PATENT AND TRADEMARK OFFICE
CERTIFICATE OF CORRECTION

PATENT NO. : 6,760,108 B2
DATED : July 6, 2004
INVENTOR(S) : Manabu Ohga

It is certified that error appears in the above-identified patent and that said Letters Patent is hereby corrected as shown below:

Column 14,
Line 31, "comprising" should read -- comprising: --; and
Line 36, "side;" should read -- side; and --.

Signed and Sealed this

Twenty-fifth Day of October, 2005

JON W. DUDAS
*Director of the United States Patent and Trademark Office*